W. BLEY.
Feed-Mechanisms for Lathes.

No. 156,758. Patented Nov. 10, 1874.

Witnesses
J. B. Connolly
F. A. Connolly

Inventor
William Bley
By Connolly Bro
Attorneys

UNITED STATES PATENT OFFICE.

WILLIAM BLEY, OF REESEVILLE, PENNSYLVANIA.

IMPROVEMENT IN FEED MECHANISMS FOR LATHES.

Specification forming part of Letters Patent No. 156,758, dated November 10, 1874; application filed June 25, 1874.

*To all whom it may concern:*

Be it known that I, WILLIAM BLEY, of Reeseville, in the county of Chester and State of Pennsylvania, have invented certain new and useful Improvement in Lathe-Feed for Common Turning and Cutting Screws; and I do hereby declare the following to be a full, clear, and exact description of the invention, such as will enable others skilled in the art to which it pertains to make and use it, reference being had to the accompanying drawings, which form part of this specification, in which—

Figure 1:
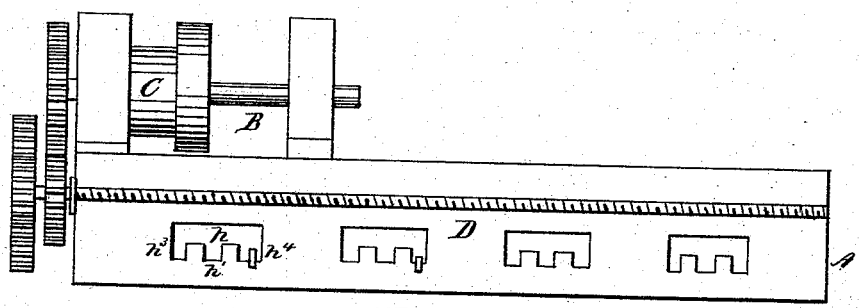
Figure 2:
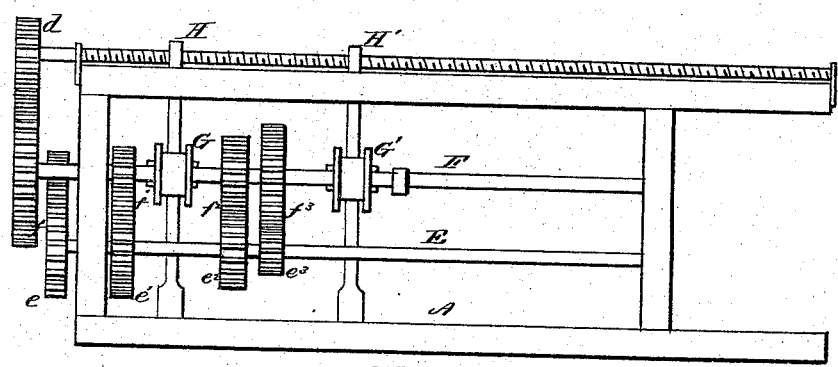
Figure 3:
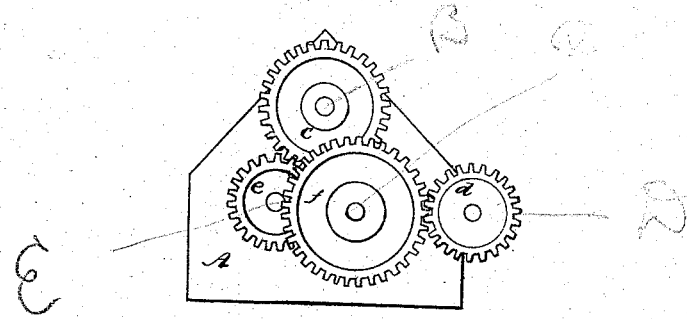

Figure 1 is a side view, Fig. 2 is an underside plan, and Fig. 3 an end view, of my invention.

The object of my invention is to produce a lathe-feed for common cutting and screw turning, so constructed and arranged that various sizes of screws may be cut without change or removal of parts, as hereinafter more fully described.

The nature of my invention consists in the peculiar construction and combination of parts, having reference particularly to employing, in connection with the driving and feed shafts, a series of intermediate gear-wheels and clutches, so arranged that, while the speed of the said driving-shaft may be kept uniform, the speed of the screw or feed shaft may be varied to produce a larger or finer thread, as may be desired.

Referring to the accompanying drawing, A represents a lathe-bed, of the usual or any suitable construction, supporting a driving-shaft, B, having a pulley, C. D represents the feed-shaft, driven from the shaft B by means of the intermediate gearing now to be described.

E represents a shaft, provided with the gears $e^1$ $e^2$ $e^3$, engaging with the wheels $f^1$ $f^2$ $f^3$ on the shaft F, which is also furnished with the double sliding clutches G G'. The wheels $e^1$ $e^2$, &c., are fast at all times upon the shaft E, while the wheels $f^1$ $f^2$, &c., are loose on the shaft F, except when any one of them is brought into engagement with one of the clutches G G', when the wheel so engaged turns with its shaft, the others being loose thereon.

The operation of the invention is as follows: Motion being communicated to the shaft B, by means of the pulley C, it is transmitted to the shaft E through the gears $c$ and $e$. In order to communicate a corresponding motion of the desired speed to the shaft F, and thence to the shaft D, through the gears $d$ $f$, one of the clutches G G' is brought into engagement with one of the wheels $f^1$ $f^2$ $f^3$— with $f^1$, if a coarse thread be desired; with $f^2$ for a finer thread; and with $f^3$, if the finest thread is required to be produced. As soon as the clutch is thus brought into engagement the wheel with which it thus engages rotates the shaft F, communicating the desired motion and speed to the feed-shaft D.

I have shown but three sets of wheels, $e^1 f^1$, &c., but I do not limit myself thereto, reserving the right to use a greater or less number, as may be desired.

The clutches G and G' are made double, so as to engage alternately with either of the adjacent wheels; but they may be made single, if desired.

The construction shown, however, I consider entirely suitable, and, being the most economical, is probably the best for the purpose in view.

H H' represent levers, for moving the sliding clutches G G'. These levers move through horizontal slots $h$ in the bed A, said slots having each notches, in which the levers rest.

When the levers are in the central notches $h^1$ $h^2$, the clutches are disengaged. When either is moved into one of the end notches $h^3$ $h^4$, the clutch to which it is attached is moved into engagement with the corresponding wheel $f^1$, $f^2$, or $f^3$. Beneath each of the notches $h^3$ $h^4$ is a number indicating the size of the thread which will be cut when the lever H or H' is thrown into said notch.

These improvements may be attached to an old lathe, or built in a new one.

What I claim as my invention is—

1. The combination, with the feed-screw D, of the shaft E, holding the fixed graduated gear-wheels $e^1$ $e^2$, &c., the shaft F having correspondingly-graduated loose wheels $f^1$ $f^2$, &c., the clutches G G', and clutch-levers H H', said feed-screw and shaft F being geared together, substantially as shown, and for the purpose specified.

2. The gaging-racks $h$, in combination with the levers H H', clutches G G', gearing $e^1 e^2 f^1 f^2$, and feed-screw D, substantially as and for the purpose specified.

In testimony that I claim the foregoing I have hereunto set my hand this 12th day of June, 1874.

WILLIAM BLEY.

Witnesses:
M. DANL. CONNOLLY,
T. F. HARTMAN.